Jan. 9, 1962 E. F. ELMS ET AL 3,015,866
MOLDING ENGAGING SPRING FASTENER
Filed Dec. 3, 1959 2 Sheets-Sheet 1
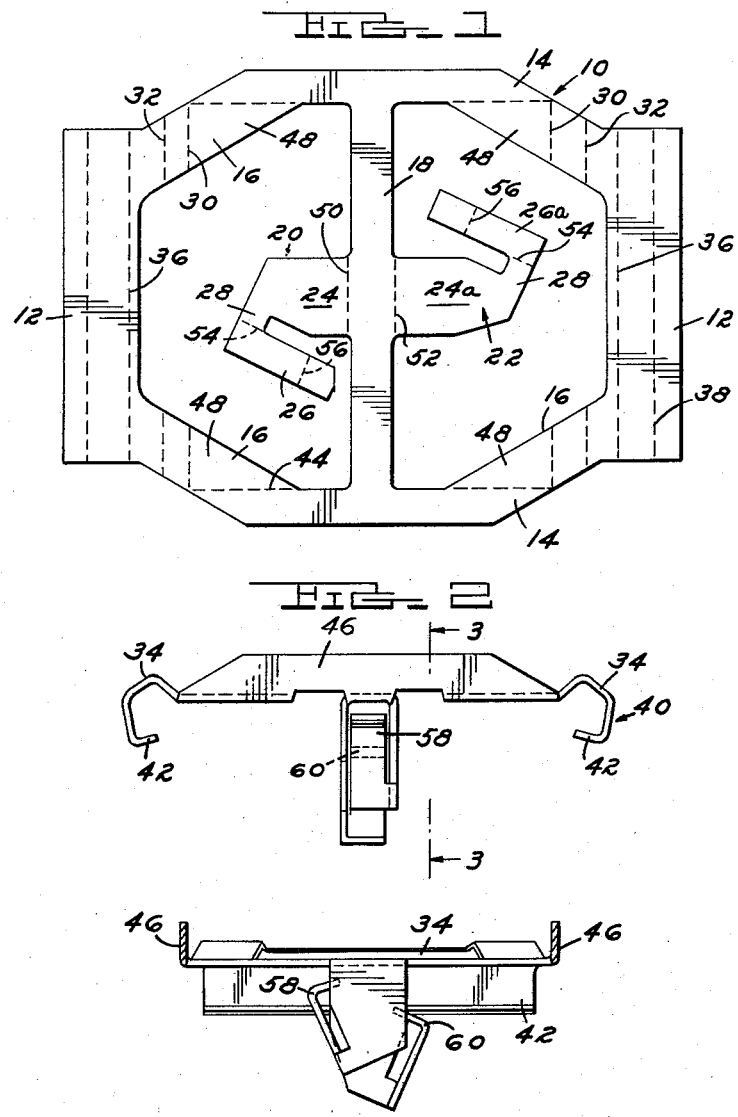
INVENTORS
EDWIN F. ELMS
THOMAS B. SAUNDERS
BY
Barney, Kiselle, Raisch & Choate
ATTORNEYS

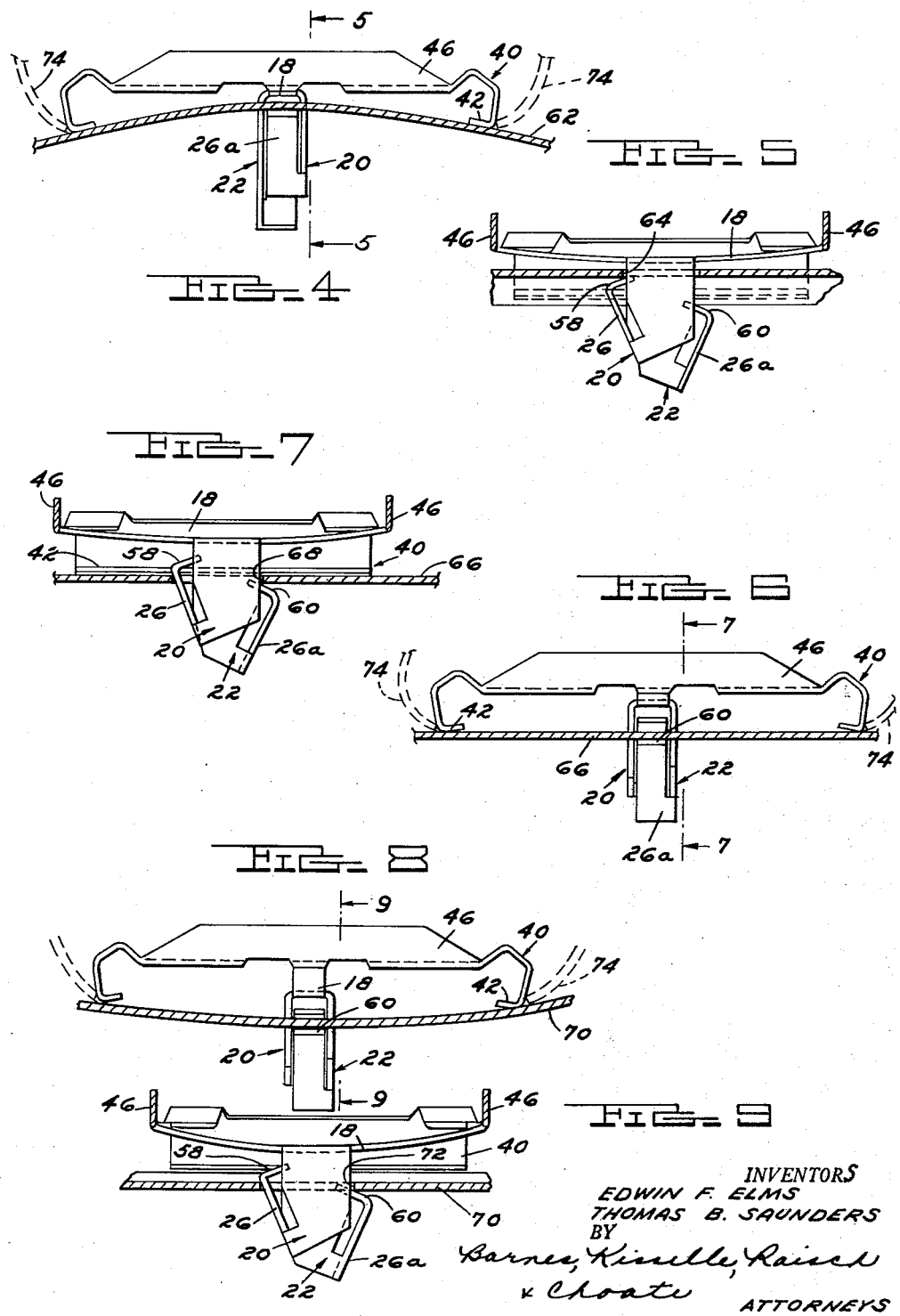

United States Patent Office 3,015,866
Patented Jan. 9, 1962

3,015,866
MOLDING ENGAGING SPRING FASTENER
Edwin F. Elms, Roseville, and Thomas B. Saunders, St. Clair Shores, Mich., assignors to Robert L. Brown, Ferndale, Mich.
Filed Dec. 3, 1959, Ser. No. 857,049
8 Claims. (Cl. 24—73)

This invention relates to spring fasteners and more particularly to fasteners of the type employed for retaining trim moldings on body panels of automobiles and the like.

The primary object of this invention resides in the provision of a fastener of the above described type which is designed so that it will retain a trim molding on either a flat, concave or convex panel surface.

In the drawings:

FIG. 1 is a plan view of the sheet metal blank employed for forming the fastener of the present invention.

FIG. 2 is a side elevational view of the fastener.

FIG. 3 is a sectional view along the line 3—3 in FIG. 2.

FIG. 4 shows the fastener mounted on a generally convex panel surface.

FIG. 5 is a sectional view along the line 5—5 in FIG. 4.

FIG. 6 shows the fastener mounted on a flat panel surface.

FIG. 7 is a sectional view along the line 7—7 in FIG. 6.

FIG. 8 shows the fastener mounted on a concave panel surface.

FIG. 9 is a sectional view along the line 9—9 in FIG. 8.

Referring first to FIG. 1, the blank 10 there illustrated for forming the fastener of the present invention is stamped from spring steel. The blank 10 is of generally rectangular shape and includes opposite end sections 12 and opposite side portions 14. At their opposite ends, the side portions 14 are angled inwardly as at 16 to connect with the ends of the end portions 12. A cross bar 18 disposed medially between the end portions 12 extends between and connects with the side members 14. At the center thereof, the cross bar 18 is provided with oppositely extending tabs 20, 22. Each tab has a body portion 24, 24a, respectively, and a leg portion 26, 26a, respectively, connected with the body portion by a neck 28. It will be observed that the length of the body portion 24a of tab 22 measured in a direction parallel to the side members 14 is greater than the length of body portion 24 of tab 20.

In forming the fastener from the blank shown in FIG. 1, the blank is bent upwardly about the broken lines indicated at 30 and downwardly about the broken lines indicated at 32. The downwardly bent portions 34 are bent downwardly and inwardly about the broken lines indicated at 36 and then bent inwardly and upwardly about the broken lines indicated at 38. The bending of the opposite end portions of blank 10 as described provides at opposite ends of the fastener molding engaging flanges 40, the lower edge portions 42 of which are adapted to be seated against the supporting panel on which the trim molding is to be mounted.

The side members 14 of the blank are bent upwardly about the broken lines indicated at 44 to form rigid upright flanges 46 along each side of the fastener. The four corners of the fastener are reinforced by horizontally disposed gusset sections 48 provided by the inwardly angled portions 16 of the blank.

Tabs 20 and 22 are bent downwardly about the bend lines indicated at 50 and 52, respectively, in FIG. 1. The body portions 24, 24a of the two tabs are thus disposed in a downwardly depending parallel relation on opposite sides of cross bar 18. Legs 26, 26a are bent inwardly toward each other about the bend lines 54 and the upper ends thereof are bent inwardly toward each other about the bend lines 56. Since, as pointed out above, the body portion 24a of tab 22 has a greater length than the body portion 24 of tab 20, spring leg 26a extends lower than spring leg 26. The inwardly bent upper end of spring leg 26 forms a shoulder 58 and the inwardly bent upper end of spring leg 26a forms a shoulder 60. Shoulders 58 and 60 are disposed at opposite sides of the two tabs with shoulder 58 lying in a plane spaced above the bottom edges 42 of the molding engaging members 40 and shoulders 60 lying in a horizontal plane closely adjacent and spaced slightly below the plane of the bottom edges 42 of the molding engaging members 40.

The construction features of the fastener described permit mounting of the fastener on either flat, concave or convex surfaces. The ability to use the fastener on surfaces of such varying contour is attributable to the rigid frame construction of the fastener in combination with the readily flexible spring cross bar 18 and the vertically spaced shoulders 58, 60 on the spring legs 26.

In FIGS. 4 and 5, the fastener is shown applied to a generally convex surface. The convex supporting panel is designated 62 and the aperture therein is designated 64. In mounting the fastener on the convex portion of panel 62, the lower ends of tabs 20, 22 are inserted in opening 64 and the cross bar 18 is manually sprung or pushed downwardly at its center towards panel 62 to a position wherein the shoulder 58 engages the underside of the panel. Cross bar 18 acts in the manner of a flat leaf spring. As the tabs 20, 22 are pushed through the opening 64, the spring legs 26 and 26a flex inwardly toward one another so that the hole 64 in panel 62 need not be substantially wider than the body portions 24, 24a of the tabs. When the shoulder 58 passes through the opening 64, the spring leg 26 on which the shoulder 58 is formed springs outwardly to interengage shoulder 58 with the underside of panel 62 and thereby retain the fastener firmly mounted on panel 62 at opening 64 with the spring cross bar 18 in the downwardly sprung condition shown.

When the fastener is used on a substantially flat panel, the operation of mounting the fastener on the panel is the same as described above with reference to a convex panel 62 except that the fastener is secured to a flat panel by the interengagement of the lower shoulder 60 rather than the upper shoulder 58. This is illustrated in FIGS. 6 and 7. It will be noted that even in the case of a flat panel such as shown at 66, when the shoulder 60 engages the underside of the panel at the opening 68, the spring cross bar 18 is in a downwardly flexed position. Likewise, in the case of a concave panel 70 as shown in FIGS. 8 and 9, the fastener is secured to the panel by engaging the shoulder 60 with the underside of the panel through the aperture 72 therein but the spring cross bar 18 has to be flexed downwardly a greater extent.

The spring cross bar 18 in combination with the vertically spaced shoulders 58, 60 thus enables mounting the fastener on panels which vary considerably in surface contour. It will be noted, however, that the fastener flexes to accommodate such variations primarily at the spring cross bar 18. The upright flanges 46 maintain the frame portion of the fastener substantially rigid in a vertical direction. The spacing between the molding engaging portions 40 is not substantially changed when the fastener is mounted on a panel. The flexing of cross bar 18 is substantially greater than any lateral flexing of flanges 46 or the flexing of the members 40 at the bend lines 30, 32 and 36. The manner in which the molding 74, which, for the purposes of this invention, may vary considerably in cross section, is retained in place on the panel is clearly illustrated in FIGS. 4 through 9.

We claim:

1. A sheet metal fastener for retaining a molding on a support panel comprising a pair of spaced apart and oppositely disposed molding engaging members having bottom edge portions adapted to bear against one face of the panel when the fastener is mounted thereon, a pair of spaced apart vertically rigid struts interconnecting said molding engaging members adjacent their opposite ends, said struts having their lower edges disposed in a plane spaced above said bottom edge portions of said molding engaging members, a flat leaf spring member extending transversely between and connecting said struts at generally the central portion thereof, said leaf spring member being readily flexible in a vertical direction, said leaf spring member also lying in a plane spaced above the bottom edge portions of said molding engaging members, and a pair of spring lugs depending from said central portion of said leaf spring member, said lugs providing two vertically spaced panel engaging shoulders.

2. A fastener as called for in claim 1 wherein one of said shoulders is disposed in a horizontal plane above the bottom edge portions of said molding engaging members.

3. A fastener as called for in claim 1 wherein one of said shoulders is disposed in a horizontal plane above the bottom edge portions of said molding engaging members and the other shoulder is disposed in a horizontal plane closely adjacent the plane of said bottom edge portions of said molding engaging members.

4. A fastener as called for in claim 1 wherein said lugs each comprise a downwardly bent tab provided with an upwardly and outwardly inclined spring leg, the upper end portions of said spring legs forming said shoulders.

5. A sheet metal fastener for retaining a molding on a support panel comprising a generally open, rectangularly shaped frame, as viewed in plan, having at one pair of its opposite ends molding engaging members which extend downwardly below the general plane of said frame, the other pair of opposite ends of the frame being defined by connecting members extending between and connecting the opposite end portions of the molding engaging members, said connecting members being relatively rigid and inflexible in a direction normal to the plane of said frame, and a cross bar spaced medially between said molding engaging members and connected at its opposite ends with said connecting members, said connecting members and cross bar being disposed above the plane of the lower edges of the molding engaging members, said cross bar comprising a generally flat horizontally disposed spring strip which is flexible and resilient in a direction normal to the plane of said frame, said cross bar having at the central portion thereof depending lug means providing two vertically spaced shoulders.

6. A fastener as called for in claim 5 wherein one of said shoulders is disposed in a plane above the plane of the lower edges of the molding engaging members.

7. A fastener as called for in claim 5 wherein one of said shoulders is disposed in a plane above the plane of the lower edges of the molding engaging members and the other shoulder lying in a plane horizontally adjacent the plane of the lower edges of the molding engaging members.

8. A fastener as called for in claim 5 wherein said lug means comprise a pair of downwardly bent tabs, one on each side edge of said spring strip, each tab having at the lower end thereof a spring leg inclined upwardly and outwardly and terminating at its upper end in said shoulder, said spring legs being inclined upwardly and outwardly in opposite directions.

References Cited in the file of this patent

UNITED STATES PATENTS

| | | |
|---|---|---|
| 2,181,966 | Dean | Dec. 5, 1939 |
| 2,188,026 | Wiley | Jan. 23, 1940 |
| 2,561,006 | Waara | July 17, 1951 |
| 2,685,721 | Eves | Aug. 10, 1954 |
| 2,885,754 | Munse | May 12, 1959 |